Patented July 8, 1924.

1,500,276

UNITED STATES PATENT OFFICE.

JOSEPH SCHNEIBLE, OF CHICAGO, ILLINOIS.

COMPOUNDING VEHICLE OR BASE.

No Drawing.   Application filed December 17, 1921.   Serial No. 523,234.

*To all whom it may concern:*

Be it known that I, JOSEPH SCHNEIBLE, a citizen of the United States, residing at 130 North Wells Street, Chicago, in the county of Cook and State of Illinois, have invented a new and useful Improvement in Compounding Vehicles or Bases, of which the following is a specification.

In accordance with the present invention, a tasteless, white, unctuous mass, particularly suitable for use as a vehicle for pharmaceuticals and medicaments and as a base for cosmetics, may be prepared in the following manner.

A neutral soap is prepared by the interaction of a suitable alkaline material, such as caustic potash, with a fatty acid or a fat, such as cocoanut oil, in the presence of water. Equimolecular proportions of the reacting materials are used and the reaction is carried out in the presence of water in any desired proportion at a temperature preferably below the boiling-point of water, preferably that secured by the use of a water-bath. Upon completion of the saponification, the soap solution being maintained at a temperature above, say 135° F., sufficient fatty acid, preferably stearic acid, is added to give the desired consistency to the final product and is thoroughly intermixed with the soap solution. The mass at this stage assumes the general appearance of a thick starch jelly. The mass is then allowed to cool very slowly to below the congealing temperature of the fatty acid, the cooling being controlled by placing the mass in a wooden vessel or other vessel having walls of low heat conductivity, or by cooling the material in a bath, the temperature of which is but slightly below the crystallization temperature of the fatty acid. During this slow cooling the mass changes in character from a translucent, jelly-like mass to an opaque, white, uniform mass through which the fatty acid is distributed in finely dispersed form. After this cooling the mass is thoroughly intermixed, preferably by triturating or grinding, for example, in a paint mill, until the desired unctuous, creamy texture is obtained. This intermixing may take place during the cooling, if desired. The proportion of water in the mass and the proportion of fatty acid is, as above stated, varied to secure the desired consistency in the mass. For example, for a mass suitable for use in a shaving cream, the proportion of fatty acid employed may suitably be about one-half the proportion of soap and the amount of water present may be such that the total solids in the mass are from 15 to 20%.

In using a fat or oil to produce the soap in the above process, an equivalent proportion of glycerine is incorporated into the mixture. If desired, additional glycerine may be added, as may other coloring, flavoring or antiseptic constituents. In using a fatty acid, no glycerine is formed, and if the presence of any be desired, it may be added.

In using fatty acids for the preparation of the initial soap, an excess of fatty acids may be present during the saponification to supply the free fatty acid which is later supplied in the process as above described. The mass may be produced with greater facility, however, by incorporating the excess of free fatty acid at the later stage.

I claim:

1. A compounding vehicle or base in the form of an unctuous mass containing a neutral soap, water, and free fatty acid finely and uniformly dispersed therethrough.

2. A compounding vehicle or base in the form of an unctuous mass containing a neutral soap, water and stearic acid finely and uniformly dispersed therethrough.

3. A compounding vehicle or base in the form of an unctuous mass containing a neutral soap, water, and free fatty acid finely and uniformly dispersed therethrough, there being 15 to 20% of solids therein, and the proportion of free fatty acid being about one-half that of neutral soap.

4. The process of preparing a compounding vehicle or base which comprises forming a solution of a neutral soap in water, incorporating a fatty acid therein at a temperature above the melting point of said acid and slowly cooling the mixture to below the crystallization temperature of the fatty acid, whereby the fatty acid is finely and uniformly dispersed through the mass.

5. The process of preparing a compounding vehicle or base which comprises forming a solution of a neutral soap in water, incorporating a fatty acid therein at a temperature above the melting point of said acid, slowly cooling the mixture to below the crystallization temperature of the fatty acid, whereby the fatty acid is finely and uniformly dispersed through the mass, and thoroughly intermixing the mass.

6. The process of preparing a compounding vehicle or base which comprises forming a solution of a neutral soap in water, incorporating a stearic acid therein at a temperature above the melting point of said acid, slowly cooling the mixture to below the crystallization temperature of the stearic acid, whereby the stearic acid is finely and uniformly dispersed through the mass, and thoroughly intermixing the mass.

7. The process of preparing a compounding vehicle or base which comprises forming a solution of a neutral soap in water, incorporating a stearic acid therein at a temperature above the melting point of said acid, the proportion of fatty acid being about one-half that of soap and the total solids in the mass being 15 to 20%, slowly cooling the mixture to below the crystallization temperature of the stearic acid, whereby the stearic acid is finely and uniformly dispersed through the mass, and thoroughly intermixing the mass.

JOSEPH SCHNEIBLE.